United States Patent [19]

Worley

[11] Patent Number: 4,621,474
[45] Date of Patent: Nov. 11, 1986

[54] GRID CONNECTORS FOR SUSPENSION CEILING

[75] Inventor: Robert F. Worley, Bay Village, Ohio

[73] Assignee: Donn Incorporated, Westlake, Ohio

[21] Appl. No.: 758,791

[22] Filed: Jul. 25, 1985

[51] Int. Cl.⁴ ............................................. F16B 7/22
[52] U.S. Cl. ................................ 52/667; 52/DIG. 5; 403/347
[58] Field of Search ................. 52/664, 666, 667, 484, 52/DIG. 5; 403/347

[56] References Cited

U.S. PATENT DOCUMENTS

| | | | |
|---|---|---|---|
| 3,193,063 | 7/1965 | Brown et al. | 52/667 |
| 3,378,976 | 4/1968 | Meredith, Jr. | 52/573 |
| 3,426,496 | 2/1969 | Jones | 52/669 |
| 3,501,185 | 3/1970 | Brown et al. | 52/664 |
| 3,503,641 | 3/1970 | Fraser | 52/667 X |
| 3,746,379 | 7/1973 | Sauer | 52/667 |
| 4,108,563 | 8/1978 | Brown et al. | 403/347 |

Primary Examiner—J. Karl Bell
Attorney, Agent, or Firm—Pearne, Gordon, Sessions, McCoy, Granger & Tilberry

[57] ABSTRACT

A suspension ceiling grid system is disclosed which provides intersections including through-runners and oppositely extending runner ends. The through-runner is provided with a connector opening and the runner ends are provided with identical end connectors. The end connectors are engaged and disengaged by lateral movement and provide spring means which resiliently urge the end connectors toward the locked position. The end connectors provide two locking systems, one of which provides a connection with the through-runner when only one connector is installed in the connector opening, and subsequently provides an improved strength functionally direct connection between the two end connectors when two end connectors are installed within the connector opening from opposite sides. The end connectors provide a second separate locking system which directly connects between the two end connectors. In one embodiment, a connector system is disclosed which allows easy removal of a runner within an assembled grid.

11 Claims, 11 Drawing Figures

GRID CONNECTORS FOR SUSPENSION CEILING

BACKGROUND OF THE INVENTION

This invention relates generally to suspension ceiling grid systems, and more particularly to a novel and improved end connector system for such grids.

PRIOR ART

Suspension ceiling grid systems usually provide grid tees or runners which interconnect at intersections to provide openings in which panels or fixtures are positioned. In some systems, the grid includes main runs which extend parallel to each other and perpendicular cross runs which are connected at their ends on opposite sides of the main runs. In other systems such as basket weave systems, the grid does not include main runs and cross runs; however, both systems provide intersection connections in which a through-runner extends through the intersection and aligned, opposed runners connect at their ends to opposite sides of the through-runner.

Usually the through-runner provides a connector opening and the aligned, opposed runners provide end connections which extend from opposite sides into the through-runner connector opening. Examples of such grid runners and end connectors are illustrated in U.S. Pat. Nos. 3,193,063; 3,378,976; 3,426,496; 3,501,185; 3,503,641; and 4,108,563.

In some instances, the end connectors connect with the through-runner and do not directly connect with the associated end connector of the opposed runner. U.S. Pat. Nos. 3,193,063 and 3,378,976, supra, disclose such systems. In other instances, the end connector provides two separate locking systems, one of which connects with the through-runner even when another connector is not present within the through-runner connector opening (often referred to as a "first end-in lock"), and the other locking system provides a direct connection between the two end connectors when both such connectors are installed within the through-runner connector opening. U.S. Pat. No. 4,108,563, supra, discloses such a connection. In such end connectors the first end-in lock normally does not contribute significantly to the ability of the connectors to resist separating forces.

In most grid connector systems, the through-runner connector opening is formed to position the two end connectors for locking engagement, and the locking system itself is deflectable to allow assembly. Such systems are often very difficult to disassemble, particularly from locations within an assembled grid spaced from the periphery thereof. In such location, spacing between two through-runners at the ends of the given runner is fixed and maintained by the surrounding portions of the grid, so it is impossible to move a runner and its connector lengthwise of the runner any significant distance to disconnect the end connections or to reinstall the runner. In the past, removal and installation of a runner within a system has usually required bending or otherwise damaging the connector, and has been very difficult to accomplish.

SUMMARY OF THE INVENTION

There are a number of aspects to the present invention. In accordance with one important aspect, an end connector is installed by longitudinal movement into a connector opening within the web of a through-runner and is provided with a lock system which is engaged or disengaged by lateral movement of the connector within the connector opening. Spring means are provided to bias the connector laterally within the connector opening into the locked position. Such spring means normally maintains the connector in the locked position while permitting lateral movement in the opposite direction to release the lock system and allow removal of the connector.

In accordance with another aspect of this invention, the lock system provides a connector opening having opposed, inwardly extending projections, and the connector provides rearwardly facing surfaces which are moved by the spring means behind the projections to lock the connector to the through-runner even when only one connector is positioned in the opening. This feature, which provides a first end-in lock, facilitates the assembly of the grid by allowing the installation of the connector at one end of the grid runner which is secure and maintains such runner end connection while the connector at the other end is being installed. Further, it allows assembly of grids in which at least some of the runners are installed in a pattern in which opposed runners do not exist at all intersections.

Preferably, such rearwardly facing surfaces on one connector are aligned with the corresponding surface of an identical connector extending in the opposite direction through a connector opening so that the projection located between the two opposed, rearwardly facing surfaces is not subjected to excessive bending forces. With such a locking system, improved locking strength is provided when the second connector is installed within a given connector opening.

In accordance with another important aspect of the invention, a novel and improved dual lock end connector is provided. Such end connector provides a first lock system which connects with the through-runner when only one end connector is installed in the connector opening of the through-runner. A second and separate lock system connects directly between the two opposed end connectors when two opposed end connectors are installed in the connector opening of the through-runner.

Both such lock systems are engaged and disengaged by lateral movement, and each end connector provides a spring laterally urging the connectors toward the locked position, while allowing movement in the opposite direction for disassembly. Therefore, the end connector can be disassembled without difficulty while providing reliable connection within a grid system.

In accordance with another aspect of this invention, a dual lock connector system is provided in which one lock system connects directly with a through-runner when only one end connector is installed and the same lock system provides a high-strength, functionally direct connection between two opposed end connectors when such two opposed end connectors are installed in a through-runner connector opening. A separate lock system is provided which directly interconnects the two opposed end connectors and the two lock systems, both of which provide high strength, cooperate to provide a very strong connection between the two opposed runners connected on opposite sides of a through-runner.

In accordance with still another aspect of this invention, a grid connector is provided which produces a strong, reliable connection while permitting easy connector release and replacement so that grid runners can be removed or installed substantially anywhere within an assembled grid system. Such removal and installation can be easily accomplished without damage to the runners or the connections.

In the embodiment incorporating this aspect of the invention, the connectors are normally installed by longitudinal movement from opposite sides into a through-runner connector opening. However, within an assembled grid, such longitudinal movement in the opposite direction, for connector removal, is presented by the surrounding grid runners. This embodiment permits the upper edge of the connector to be moved against the action of the spring to release the upper lock and to permit the through-runner to be twisted to a position in which the connector can be removed by vertical upward movement. Consequently, a given runner within a given system can be removed without significant longitudinal movement of the connector out of the connector opening, so that it is easy to remove a given runner from a grid system even when such grid runner is located well within the interior of the assembled grid. Reinstallation or installation of a runner within a given grid can be accomplished easily by the opposite movements, in which the connector is moved vertically down into the connector opening of a through-runner which has been tipped or twisted from its normal position. After the connector is positioned within the connector opening, the through-runner is allowed to return to its normal untwisted position and the installation of the connector is completed.

These and other aspects of this invention are illustrated in the accompanying drawings, and are more fully described in the following specification.

DETAILED DESCRIPTION OF THE DRAWINGS

FIGS. 1 through 6 illustrate the first embodiment of this invention. Such embodiment provides a through-runner or grid tee 10 providing a central web 11, oppositely extending panel supporting flanges 12 along the lower edge of the web, and a stiffening bulb 13 along the upper edge of the web. Although the drawings illustrate the runner as a homogeneous structure, the runners are normally formed by sheet metal bent to the illustrated cross-section.

Figure 1:
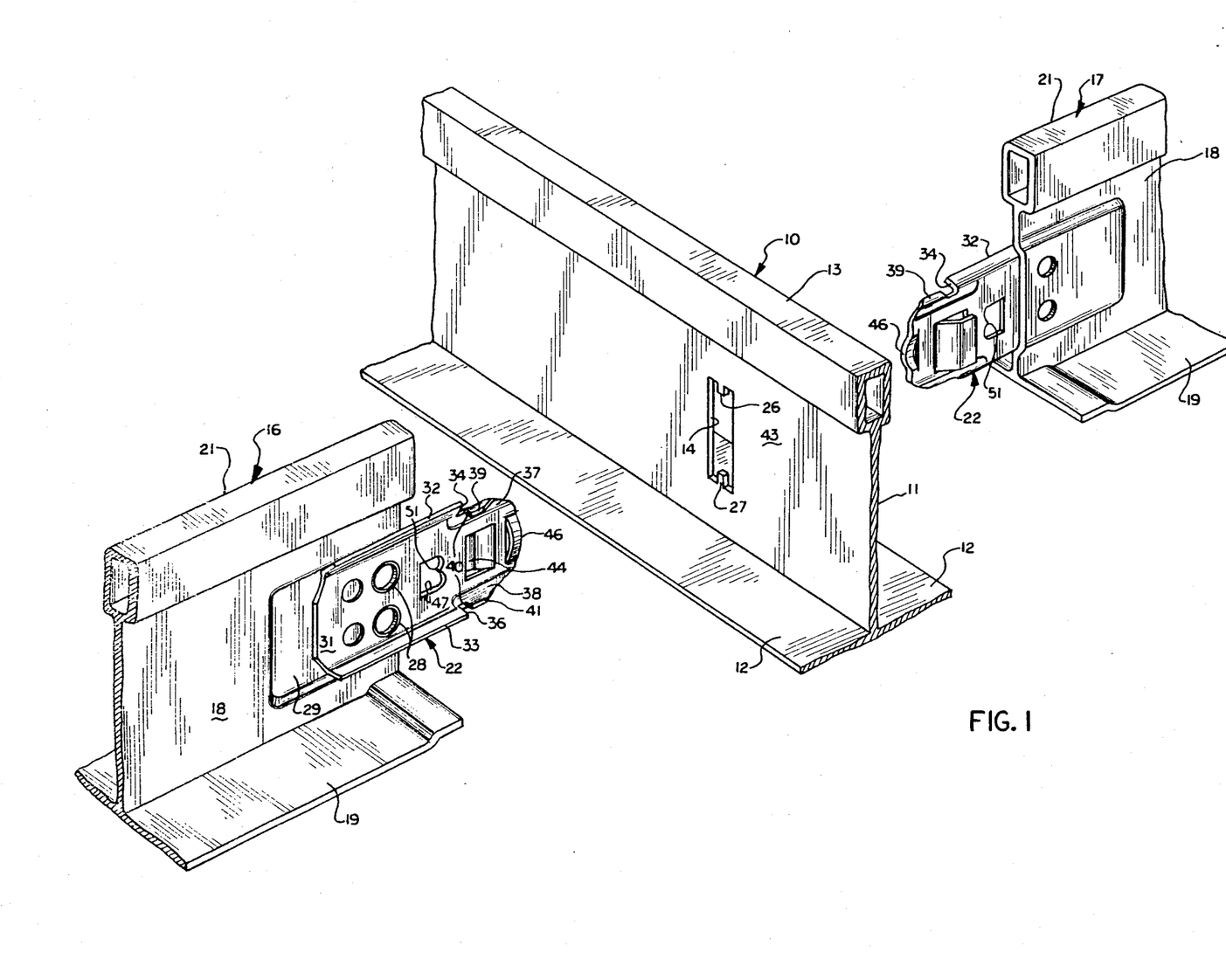
FIG. 1 is an exploded, perspective view, illustrating a through-runner and opposed end connectors before assembly of the intersection in accordance with the first embodiment of this invention.
Figure 2:
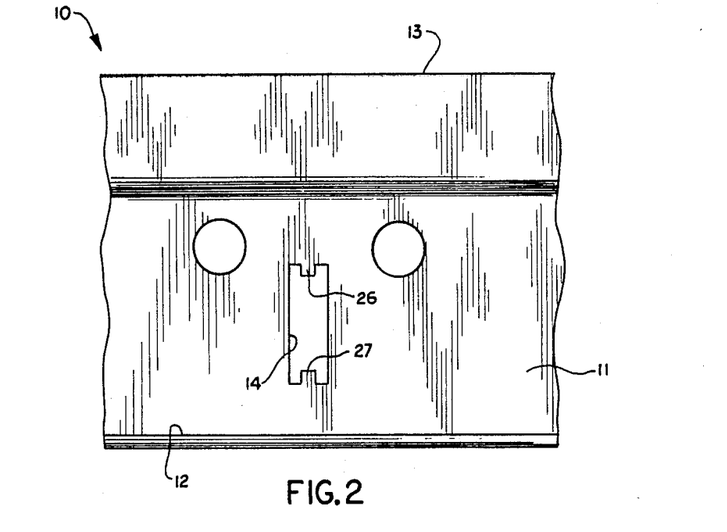
FIG. 2 is a side elevation of a through-runner, illustrating the shape of the connector opening formed in the web thereof.
Figure 3:
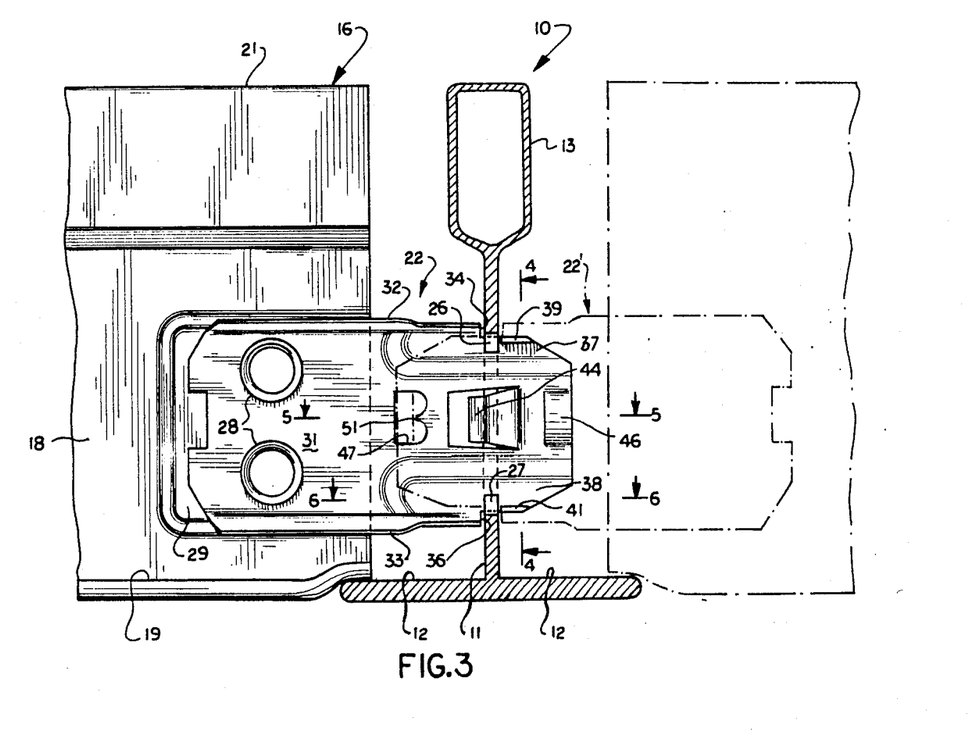
FIG. 3 is a side elevation of an intersection, illustrating one of the end connectors in full-line and the other in phantom-line.
Figure 4:
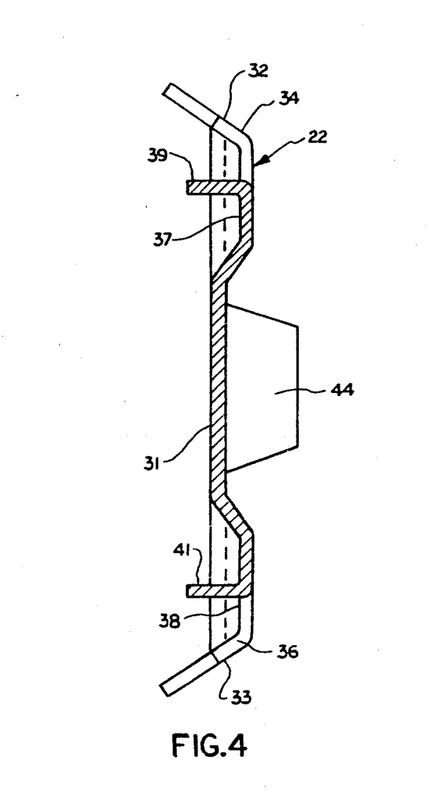
FIG. 4 is an enlarged, fragmentary section taken along line 4—4 of FIG. 3, illustrating the shape of the end of one of the connectors. In such section, only a single connector is illustrated.

The web 11 is formed with a connector opening 14 therein having a generally H-shape. A pair of opposed runners or grid tees 16 and 17 are also formed with webs 18, panel supporting flanges 19, and bulbs 21 substantially the same as the runner 10. Mounted on the end of each of the opposed runners 16 and 17 are identical end connectors 22 which are supported on the webs 18 of the opposed runners and project beyond the ends thereof. The end connectors 22 extend through the connector opening 14 from opposite sides, and are structured, as discussed in detail below, so as to interlock with each other and with the through-runner to form an assembled joint or intersection within a suspension ceiling grid system.

If the invention is applied to a grid consisting of main runs and cross runs, the main runs are provided by the runner 10 and the cross runs are the runners 16 and 17. On the other hand, in a typical basket weave system, a single type of runner is structured so that the through-runner 10 receives the ends of similar runners 16 and 17 to again provide a suspension ceiling grid system.

Each of the end connectors 22 in combination with the connector opening 14 is provided with two separate and distinct locking systems which cooperate in assembled intersections to provide a very strong joint capable of withstanding large separating forces. Such locking systems, however, can be relatively easily disassembled, again as discussed in detail below.

The connector opening shape is best illustrated in FIG. 2. Such connector opening 14 is generally Hshaped and provides opposed, inwardly extending central projections 26 and 27, which respectively extend from the upper and lower extremities of the opening 14. Such projections 26 and 27 form a significant part of one of the locking systems.

Since the two end connectors 22 are identical in structure, the following detailed description of one applies equally to both. The end connectors are formed of sheet metal mounted with a rivetlike structure 28 on the webs 18 of the opposed runners 16 and 17. The webs are formed with offsets 29 within which the connectors 22 are mounted, and the offset is proportioned so that the face 31 of the connector is aligned with the center plane of the web 18 so that when the connectors are installed at an intersection, the two opposed runners 16 and 17 are in alignment with each other.

The upper and lower edges of the connectors 22 are bent inwardly at about a 45-degree angle to provide laterally extending, opposed flanges 32 and 33 which extend to forward edges 34 and 36, respectively. Adjacent to the upper and lower edges of the forward end of the connectors 22, the metal is deformed laterally to provide a pair of longitudinally extending recesses 37 and 38, which are spaced laterally back from the surface 31 a small distance. The upper edges of the forward end of the connectors are bent laterally inward to provide short flanges 39 and 41, which are forwardly spaced from the forward ends 34 and 36 of the flanges 32 and 33, respectively. These flanges provide rearwardly facing lateral surfaces 40.

The various elements are proportioned so that the forward end of each connector is received with a close fit through the opening 14 to one side of the projections 26 and 27 until the ends 34 and 36 engage the surface 43 of the web 11 of the through-runner. Such engagement limits the inward movement of the connector with respect to the connector opening.

In such position, the rearward end of each of the flanges 39 and 41 has extended past the associated projections 26 and 27. Each connector is also provided with a spring tab 44 which then engages the side of the opening 14 and cams the connector laterally within the opening 14 so that the surfaces 40 of the flanges 39 and 41 fit behind and engage the projections 26 and 27. In such position, a preliminary locking system, or first end-in lock, is provided with the end connectors and the web of the through-runner, which acts even when only one connector is positioned in the opening 14.

Because of the symmetry of the opening and of the connectors, either connector can be installed initially within the opening and provides a preliminary locking system with the surfaces 40 and the projections 26 and 27 which retains even a single connector in its locked position. However, after one connector is installed, the opposite connector 22 can be inserted in a similar manner until its flanges 39 and 41 extend past the associated projections 26 and 27 to lock the second connector in the opening. When such a condition exists, the strength of the connection provided by the engagement between the rearward edges of the flanges 39 and 41 and the associated projections 26 and 27 is drastically increased, as is discussed in detail below. In such condition, the two connectors 22 are in effect connected directly together through the projections and the strength of the projections per se does not limit the strength of the connection provided by the first locking system.

The forward end of the end connector 22 which extends through the opening 14 is of lesser height than the remaining portions so that the flanges 39 and 41 fit between the flanges 32 and 33 of the other connector and the flanges nest into the recesses 37 and 38 of such other connector. Further, the recesses 37 and 38 are sufficiently deep to clear the projections 26 and 27 so that, once installed, the surfaces 31 of the two connectors can move laterally into engagement.

The second locking system includes a lateral strap portion 46 formed at the forward end of each of the connectors 22 and a B-shaped opening 47 rearwardly spaced from the strap 46. When the two connectors 22 are inserted in opposite directions through the connector openings 14, the strap 46 of one connector moves to a position extending into the opening 47 of the other connector so that each strap 46 of each connector extends laterally into an associated opening 47 in the other connector to provide a second locking system.

Here again, the engagement of the locking system is accomplished by lateral movement of the connectors within the opening, and such lateral movement is created by the spring tabs 44 engaging the adjacent side of the opening 14. Disengagement of the connectors is accomplished by applying a lateral force to the respective runners 16 and 17 which overcomes the action of the associated spring tabs 44 and moves the connectors laterally apart. When such action occurs, the straps 46 move out of the associated openings 47 and the flanges 39 and 41 move clear of the tabs 26 and 27, respectively. This allows removal of one or both of the connectors without permanently distorting the structure of either the connectors or the openings 14. On the other hand, once the connectors are fully inserted and locked, a substantial number of interengaging surfaces prevent separation of the connectors. The locking edges which interengage provide narrow surfaces that provide the actual locking operation. Therefore, the term "surface" or "locking surface" is intended to include the surfaces provided by edges such as the edges of the flanges 39 and 41 and the edges of the opening 47.

Figure 5:
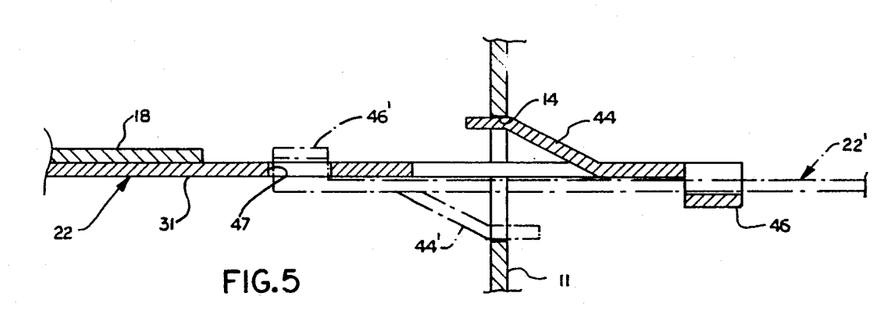
FIG. 5 is an enlarged, fragmentary section taken along line 5—5 of FIG. 3, illustrating one of the locking systems in the assembled condition.
Figure 6:
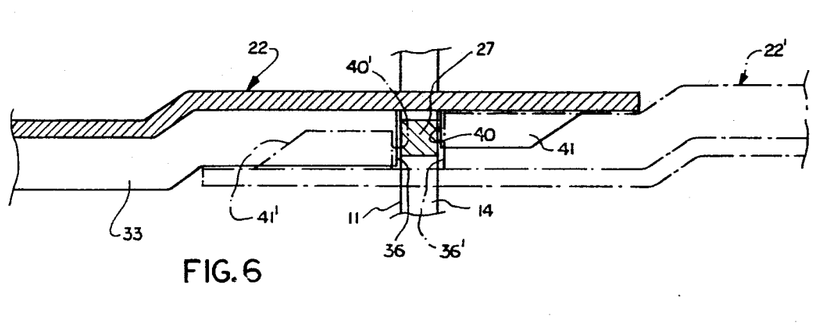
FIG. 6 is a fragmentary section similar to the section of FIG. 5, but taken along line 6—6 of FIG. 3.

FIG. 6 illustrates the operation of the preliminary connector system. In such figure, one connector 22 is illustrated in full-line section and the other connector, designated as connector 22', is illustrated in phantom. The web 11 of the through-runner provides the opening 14 through which the two connectors 22 and 22' extend in opposite directions. Located between the connectors at the lower end of the opening is the projection 27. When the two connectors are fully installed, the flange 41 of the connector 22 extends past the projection 27 and is shifted by the spring 44 (illustrated in FIG. 5) laterally until the rearward edge, or locking surface, of the flange 41 is in alignment with the projection 27. Similarly, the flange 41' of the connector 22' extends past the projection 27 and is shifted laterally by its associated spring so that the rearward edge of the flange 41' is also in alignment with the projection 27 and is in fact in alignment with an edge 40 of the flange 41 of the connector 22. In such position, the forward ends 36 and 36' of the respective connectors 22 and 22' engage the adjacent faces of the web 11 to limit further inward movement of the connectors to the illustrated position.

If only one connector 22 is positioned at a given time within the opening 14, the engagement between the projections 26 and 27 and the rearward edges 40 of the flanges 39 and 41, respectively, lock such connector in the opening as a first end-in lock. The strength of such lock, however, is not great because the projections 26 and 27 are relatively small and can be deformed if sufficient load is applied thereto. On the other hand, when both connectors are installed, a separating force applied to the runners 16 and 17 causes the end surfaces 40 of the associated flanges 41 to engage the opposite sides of the associated projections 26 and 27. The flanges 39 and 41 are proportioned so that the inner edges overlap. Therefore, part of their rearward edges 40 overlap, with the result that the projection is loaded in direct compression and is not subjected to any significant bending loads. Under such conditions, the two projections 26 and 27 operate functionally to directly interconnect the two opposed connectors 22, and such connection is capable of withstanding large separating forces without failure.

Consequently, the connection provided by the flanges 39 and 41 in cooperation with the projections 26 and 27 operates initially to provide a preliminary connection which is of relatively low tensile strength, in the order of 30 to 40 pounds, but after both connectors are installed, it supplies a strong locking connection which functionally directly connects the two runners 16 and 17.

As illustrated in FIG. 5, the second locking system is provided by the interaction of the straps 46 and associated openings 47. However, this connection functions directly between the two connectors, and does not come into play until the two end connectors 22 are installed within the opening 14. Further, the B-shape of the opening 47 provides a rearwardly extending tooth-like projection 51 which projects into the lateral opening defined by the strap 46 when a tension load is applied between the two connectors. This interlocking engagement of the tooth with the opening provided by the strap prevents the connection from separating laterally under tension loads, and increases the strength of the second locking connection. A similar structure is disclosed and claimed in U.S. Pat. No. 4,108,563, supra.

The two locking systems coact in an installed system to provide very good resistance to tensile or separating forces applied between the runners 16 and 17. The preliminary locking system, because of the engagement between the flanges 39 and 41 and the respective projections 26 and 27, provides two sets of opposed surfaces which interengage to resist separating forces. Similarly, each of the straps 46 engages the forward edge of the associated opening at two locations, so an additional four interengaging surfaces are provided by the second locking system. Consequently, the locking system combines the interengagement of six opposed pairs of surfaces. With such a locking system, as illustrated in the first embodiment of this invention, the connectors are capable of withstanding a separating force in the order of at least 300 pounds without failure.

Figure 7:
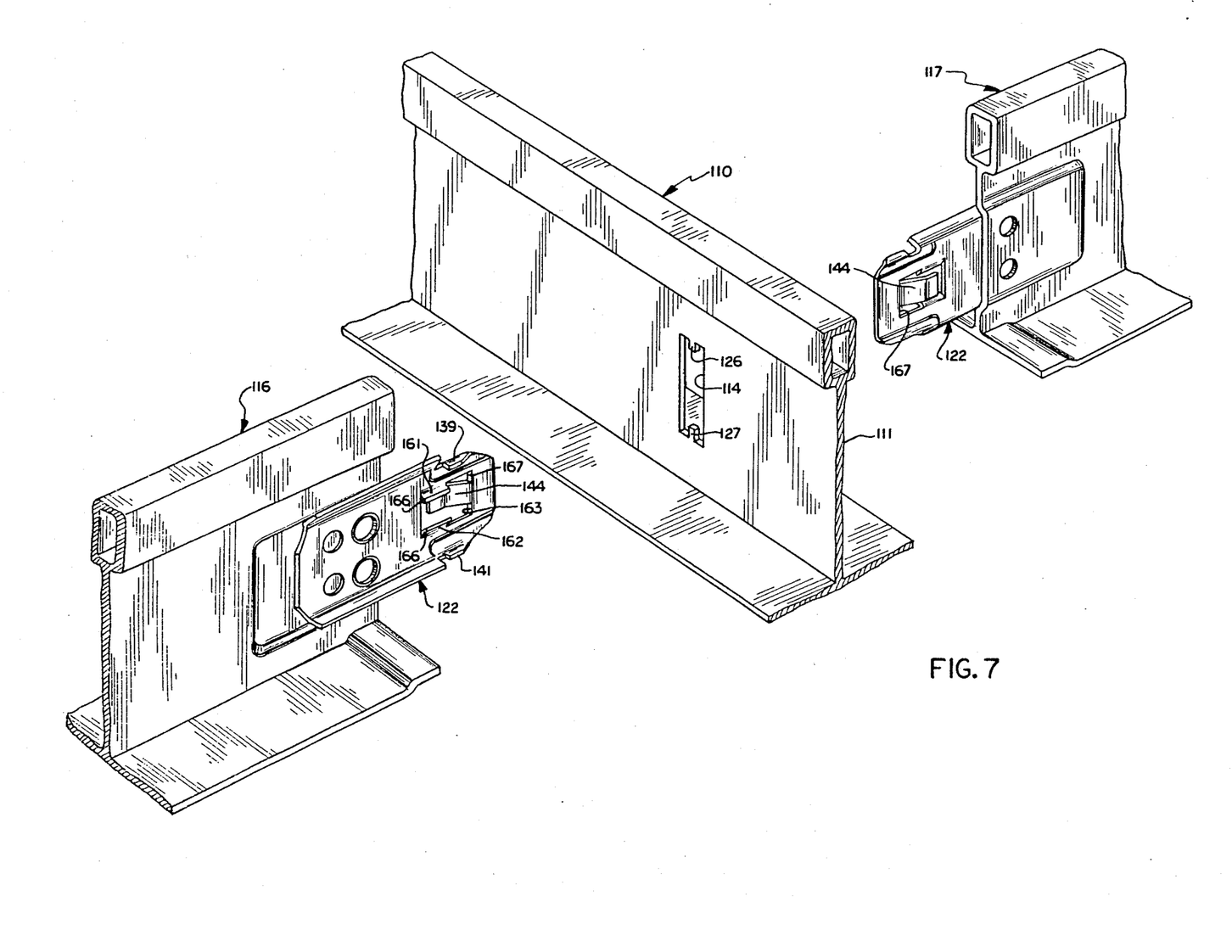
FIG. 7 is an exploded, perspective view similar to FIG. 1, but illustrating a second embodiment of this invention.

FIG. 7 illustrates a second embodiment of this invention. In such embodiment, similar reference numerals are used to designate similar parts; however, 100 is added to each such reference numeral to indicate reference to the second embodiment. The second embodiment again provides through-runners 110 and opposed runners 116 and 117. The cross section of the two runners is the same as the first embodiment. Here again, identical connectors 122 are mounted on the opposed runners 116 and 117, and are proportioned to extend through a connector opening 114 formed in the web 111 of the through-runner. The two connectors 122 provide two separate locking systems. The first locking system provided by the flanges 139 and 141 cooperates with projections 126 and 127, respectively, to provide a preliminary connection when one connector is installed within the opening 114 and an increased strength connection functionally directly connecting the two connectors when two connectors are installed within the opening. The shape and function of the first locking connection provided by the flanges 139 and 141 are identical to the corresponding locking connection of the first embodiment.

Here again a secondary locking system is provided, but in this instance the connector provides a pair of opposed, lateral projections 161 and 162 which extend longitudinally along an opening 163 for slightly less than one-half the length thereof. The projections 161 and 162 are located at the rearward end of the openings, leaving a space at the forward end thereof to receive the projections 161 and 162 of the associated connector when such connector is installed. When the two connectors are positioned in the opening 114 from opposite directions, the end 166 of the projections 161 and 162 of one end connector engage the edges or locking surface 167 of the other end connector to interlock the end connectors together. Here again, connection is provided by lateral movement of the connectors within the opening 114 created by the spring tab 144. This dual connection system again provides high strength. The first connector system provided by the flanges 139 and 141 again provides two pairs of opposed surfaces which lock the connectors together. In addition, each of the projections 161 and 162 coacts with the adjacent edge 167, so four additional interengaging surfaces are provided, for a total of six sets of interengaging surfaces. It is recognized that tolerances of manufacture tend to cause one pair of surfaces to engage prior to another; however, sufficient deformation occurs in the system to ensure that all of the locking surfaces interengage and contribute to the strength of the joint before failure occurs.

FIGS. 8 through 11 illustrate a third embodiment of this invention. Here again, similar reference numerals are utilized to designate similar parts; however, 200 is added to each reference numeral to indicate reference to the third embodiment of FIG. 8.

Figure 8:
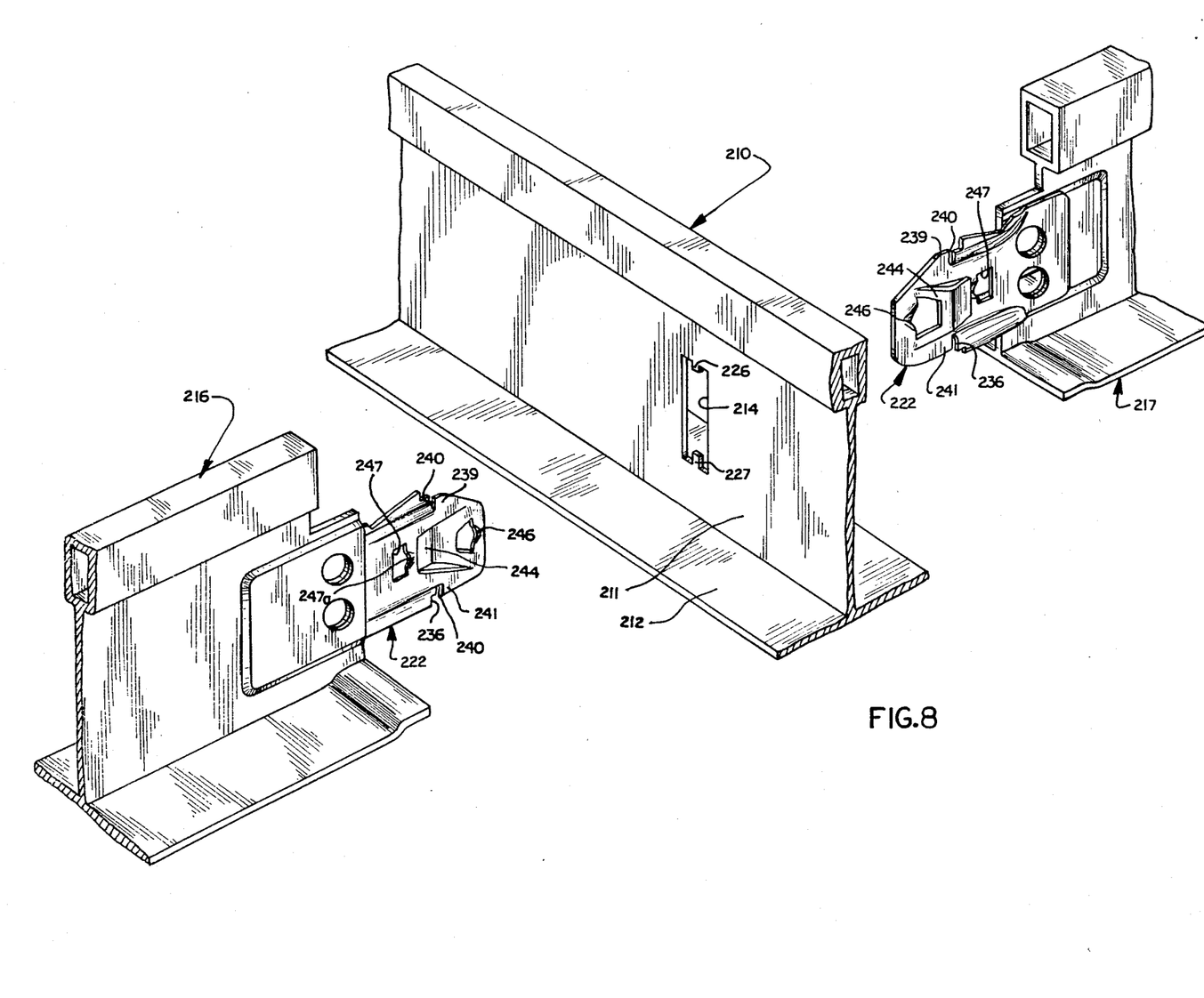
FIG. 8 is an exploded, perspective view similar to FIGS. 1 and 7 but illustrating a third embodiment of this invention.

This third embodiment again provides a first end-in lock which directly connects the end connectors to the through-runner and a second lock system which directly connects between two end connectors positioned within a connector opening. This connector system, however, has additional features discussed in detail below permitting the easy removal and installation of the connector within an assembled grid where substantial logitudinal movement of the connector ends is restrained by the remaining grid assembly.

Figure 9:
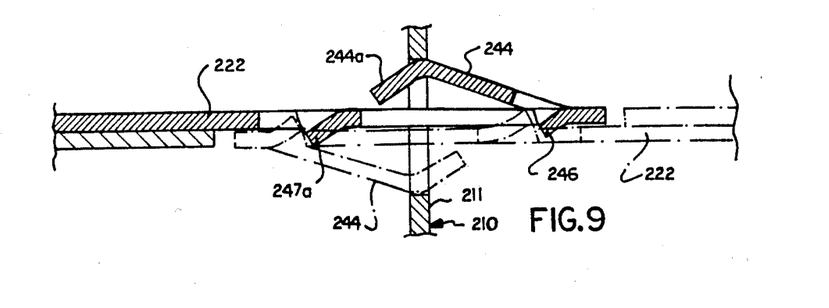
FIG. 9 is a fragmentary, centerline cross section of the embodiment of FIG. 8.

Referring now to FIGS. 8 and 9 of the drawings, the through-runner 210 is again formed with a connector opening 214 providing opposed, inwardly extending projections 226 and 227. The runner ends 216 and 217 are again provided with identical connectors 222 secured to the webs of the runner ends with a rivetlike structure.

A first end-in lock is provided by tabs 239 and 241, which provide rearwardly facing surfaces 240 which fit behind the projections 226 and 227, respectively, when the connectors 222 are inserted in the opening 214. Here again, a laterally extending spring tab 244 is provided to shift the flanges or tabs 239 and 242 laterally into a position behind the projections 226 and 227 after the insertion is complete. In this embodiment, a forward edge 236 is provided at the lower side of the connector to engage the side of the through-runner web 211 and limit the inward movement of the connector.

The second lock system is provided by a lateral strap or projection 246 and an opening 247. When two connectors are installed within the opening 214 from opposite sides, the projection 246 of one connector fits behind the opening 247 of the other connector to provide a direct lock between the two connectors on each side of the web 211 of the through-runner. Here again, locking of the two connectors is accomplished by the lateral movement produced by the spring tabs 244. The forward edge of the opening 247 provides an offset 247a which cooperates with the projection 246 to ensure a strong interlocking connection.

Figure 10:
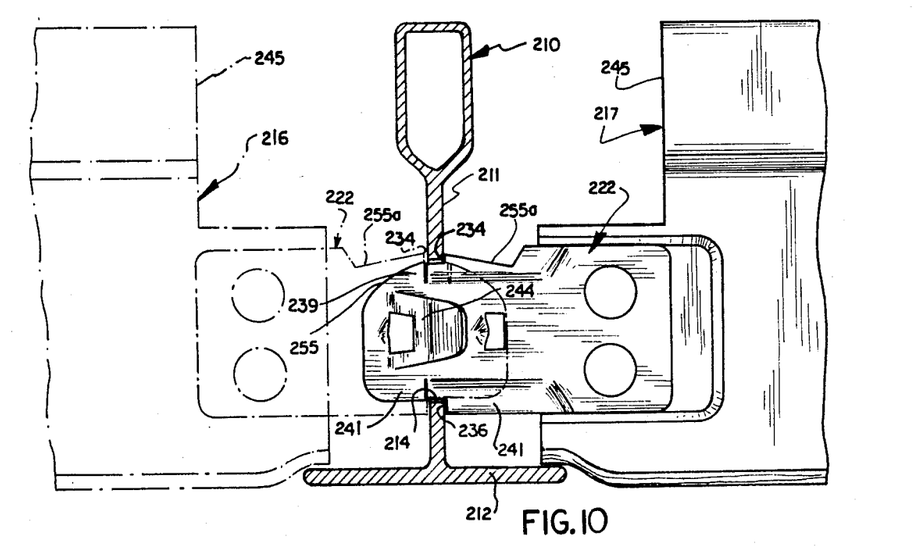
FIG. 10 is a fragmentary view of an intersection in accordance with the embodiment of FIG. 8, with one connector illustrated in phantom and the other in full-line.
Figure 11:
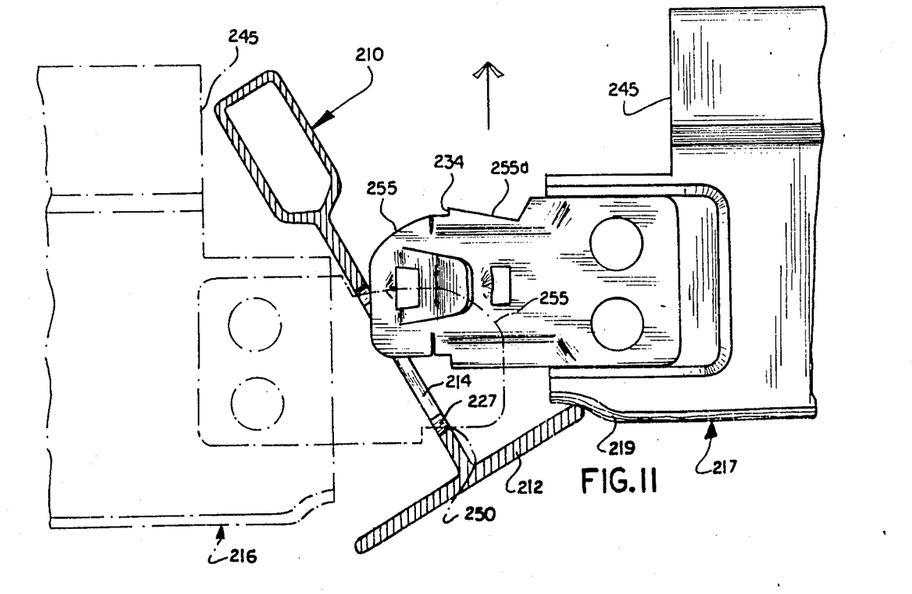
FIG. 11 is a fragmentary view similar to FIG. 10 but illustrating the position the elements assume when the through-runner is rotated during disassembly, permitting removal of a runner within an assembled grid.

FIGS. 10 and 11 illustrate the manner in which a given runner can be removed from a location within a grid assembly without requiring longitudinal movement of the runner end first being disconnected. Normally, the components of an intersection are in the position of FIG. 10, in which the through-runner 210 extends perpendicular to the runner ends 216 and 217. In FIGS. 10 and 11, the runner end 216 is illustrated in phantom, while the runner end 217 is illustrated in full-line so as to provide a better distinction between the two parts. In the normal position of FIG. 10, the web 211 of the through-runner extends vertically, with the two connectors 222 extending through the opening 214 from opposite sides thereof. In such position, the two locking systems lock the connection or intersection together.

In this embodiment, a surface 234 along the upper side of the connector has a small height, in the order of 0.02 inch. The opposed surfaces 236 and 234 of the two connectors engage opposite sides of the web 211 and normally cooperate to maintain the through-runner vertical. However, since the surface 234 is short, it is possible, as discussed in detail below, to rotate the through-runner 210 to the position of FIG. 11 when the intersection is disassembled. During such rotation, some metal tearing or deformation occurs either along the surface 234 or the opening 214. Such tearing or deformation does not result in substantial or material damage to the parts.

In the event that it is desired to remove the connector 222 of the runner end 217 from the opening without longitudinal movement, as is required in a typical interior location within an assembled grid, the upper edge of the runner end 217 is first twisted or rotated about its longitudinal axis to move the rearward edge of the tab 239 out from behind the projection 226. Such action or movement is resisted only by the spring 244 and can be easily accomplished. In such condition, the rearward edge of the tab 241, however, remains behind the projection 227.

Once the rearward edge of the upper tab 239 is released from behind the projection 226, the through-runner 210 is rotated about its longitudinal axis to the position of FIG. 11. This results in deformation of the upper edge of the opening or the surface 234 of the runner 216. In effect, this structure provides an overcomeable stop which normally maintains the web of the through-runner vertical but allows rotation about its longitudinal axis.

During such rotation, the flange 212 of the through-runner 210 engages the underside of the flange 219 of the runner end 217, and causes a raising of the runner end 217 with a pivotlike movement with respect to the flange 212 of the through-runner 210. At the same time, a pivotlike movement occurs between the through-runner 210 and the runner end 216, in which relative rotation occurs about a location at 250 along the lower edge of the connector 222 of the runner end 216 and the lower side of the opening 214. The forward ends of the two runner ends 216 and 217 are set back along an upwardly inclined edge at 245 to provide clearance and the connectors are curved at 255 and recessed at 255a to allow such rotation of the through-runner.

As the rotation of the through-runner progresses from the position of FIG. 10, the connector 222 of the runner end 217 lifts with respect to the connector 222 of the runner end 216 and this causes the tabs 246 of the respective connectors to disengage from the openings 247 of the other connector. It also causes the rearward edge of the tab 241 to lift away from the projection 227. Consequently, the two connectors, when they reach the position of FIG. 11, are disconnected from each other and from the projections 226 and 227. Therefore, the connectors themselves do not prevent any relative longitudinal movement of the runner ends 216 and 217. In the position of FIG. 11, the connector 222 of the connector end 217 is lifted up out of the opening 214 to complete the disassembly of such connector, as indicated by the arrow. Once the end connector at one end of the runner is clear and above the through-runner, longitudinal movement of the runner 217 is permitted to remove the connector at the other end of the runner 217. Such removal is usually accomplished in such a longitudinal manner rather than in the vertical manner, by merely compressing the spring 244 to release the various locks at the other end of the runner and permit withdrawal of the connector by longitudinal movement. The free end 244a of the spring 244 is bent back inwardly, as best illustrated in FIG. 9, so that the spring does not interfere with rotation of the through-runner from the position of FIG. 11 back to the position of FIG. 10. Further, because the parts of the intersection are not damaged to any material extent, they can be reassembled by the opposite movement.

Even though the connectors provide very high strength in a total grid system, the connectors permit relatively easy disassembly by applying a lateral force to the ends of the runners to compress the spring tabs and allow the connectors to move laterally to a disengaged position from which the connectors can be disassembled without damage to the connectors, and without the requirement of excessive forces.

In each illustrated embodiment of this invention, a suspension ceiling connector system is provided in which two separate and distinct connection systems cooperate to provide high strength and in which one connector system provides a first end-in connection when only one connector is installed. Further, in each embodiment, disassembly or release of the locking systems is accomplished by the simple expedient of applying a lateral force to overcome the action of the spring tabs.

Although the preferred embodiments of this invention have been shown and described, it should be understood that various modifications and rearrangements of the parts may be resorted to without departing from the scope of the invention as disclosed and claimed herein.

What is claimed is:

1. A suspension ceiling grid system comprising elongated runners providing a central web with oppositely extending flanges extending from one edge of said web, said runner being adapted to be interconnected at intersections to provide through-runner and opposed and aligned runner ends connected on opposite sides of said through-runner, said through-runner providing a connector opening in its web, said runner ends providing connectors extending longitudinally from the ends thereof, said connectors being insertable into said connector opening from opposite sides thereof by longitudinal movement of said runner ends, said connector opening and said connector being structured so that said connector is laterally movable in said opening in a direction aligned with the length of said through-runner between a release position and a locked position, said connectors providing rearwardly facing surfaces proportioned to fit through said connector opening when said connectors are in a release position and to engage the remote side of said through-runner web and prevent withdrawal of said connector when said connectors are in a locked position, and separate spring means operable when said connectors are inserted into said connector opening to move said connectors laterally from said release position to said locked position, said separate spring means permitting movement of said connector back to said release position when a lateral force is applied to said runner ends for removal of the connectors from said connector opening.

2. A suspension ceiling as set forth in claim 1, wherein said connector opening provides opposed inwardly extending projections, and said rearwardly extending surfaces engage the remote sides of said projections.

3. A suspension ceiling grid system as set forth in claim 2, wherein opposed connectors locked in said connector opening provide rearwardly facing surfaces engaging the opposite sides of said projections and said rearwardly facing surfaces of said opposed connectors are in substantial alignment so that said projections are not subjected to substantial bending moments in response to tension forces applied to said runner ends.

4. A suspension ceiling grid system as set forth in claim 3, wherein said connector opening is generally H-shaped.

5. A suspension ceiling grid system as set forth in claim 4, wherein said spring means is provided by a cantilever projection extending laterally from each connector, said cantilever projections engaging the sides of said opening and urging the associated connectors toward said opposed projections provided by said connector opening.

6. A suspension ceiling grid system comprising an elongated through-runner formed with a connector opening providing opposed inwardly extending projections and elongated opposed runner ends each providing end connectors, said end connectors providing end portions insertable through said connector opening from opposite sides thereof, said connectors and said connector openings being proportioned so that said connectors are movable within said opening laterally in a direction substantially aligned with the length of said through-runner between a release position and a locked position, each end portion providing a lateral surface positioned behind an associated projection by lateral movement to said locked position after said end portion is inserted in said opening, and spring means separate from said lateral surface resiliently urging said end connectors in said locked position to normally maintain said end connectors locked within said opening and permitting lateral movement to said release position to unlock said end connectors.

7. A suspension ceiling grid system as set forth in claim 6, wherein said lateral surfaces of two end connectors positioned within said connector opening from opposite sides thereof engage said projections from opposite sides and are aligned so that tension forces on said opposed runners place said projections in compression without substantial bending forces causing said projections to provide a functionally direct connection between opposed lateral surfaces resisting said tension forces.

8. A suspension ceiling grid system as set forth in claim 6, wherein said spring portion is provided by a cantilever projection extending laterally from each connector, said cantilever projection engaging the sides of said connector opening and urging the associated connector toward said opposed inwardly extending projection.

9. A suspension ceiling grid system comprising elongated runners each providing a central web, opposed panel supporting flanges along one edge of said web, and a bulb along the opposite side of said web, at least one of said runners providing a connector opening within its web, at least two other runners providing an end connector projecting from the end thereof, said end connectors being longitudinally insertable from opposite sides into said opening in a release position, said connectors providing lateral surfaces engageable upon lateral movement of said connector in a direction aligned with the length of said through-runner from said release position to a locked position to lock said connectors within said opening, said connectors providing a spring portion separate from said lateral surfaces operable to resiliently bias said connectors toward said locked position and permit movement to said release position when an opposing lateral force is applied.

10. A suspension ceiling grid system as set forth in claim 9, wherein said lateral surfaces engage the remote side of said web when said connectors are in said locked position.

11. A suspension ceiling grid system as set forth in claim 9, wherein said spring portion is provided by a cantilever projection on said connectors which engage the sides of said opening when said connectors are positioned therein.

* * * * *